Jan. 28, 1930.  C. L. PFEIFFER  1,744,797
METHOD OF AND APPARATUS FOR WELDING
Filed Oct. 3, 1927

Inventor
Conrad L. Pfeiffer
by  Nafaunn  Atty

Patented Jan. 28, 1930

1,744,797

UNITED STATES PATENT OFFICE

CONRAD LOUIS PFEIFFER, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR WELDING

Application filed October 3, 1927. Serial No. 223,645.

This invention relates to a method of and apparatus for welding, and more particularly to a method of and apparatus for welding sheets of metal having a high electrical conductivity.

In the welding of thin sheets of material having a high electrical conductivity it frequently happens that the electrodes adhere to the sheets after making a weld due to the fact that, since the sheets have a high conductivity, a current density which is sufficiently great to fuse the sheets will also fuse the electrodes and cause them to become welded to the sheets.

Objects of the invention are to provide a method of and apparatus for welding sheets of material having a high electrical conductivity without fusing the electrodes to the sheets.

The invention contemplates the provision of a method and an apparatus for practicing the method in which the current density in the electrode at the juncture of the electrode and sheet is small as compared to the current density in the area of contact between the sheets. In accordance with one embodiment of the invention, the sheets to be welded are brought into contact at the point where the weld is to be located and the welding current is applied to a larger area surrounding the point of contact, the sheets to be welded being separated except for their central points of contact by means of insulating strips.

Figure 1:
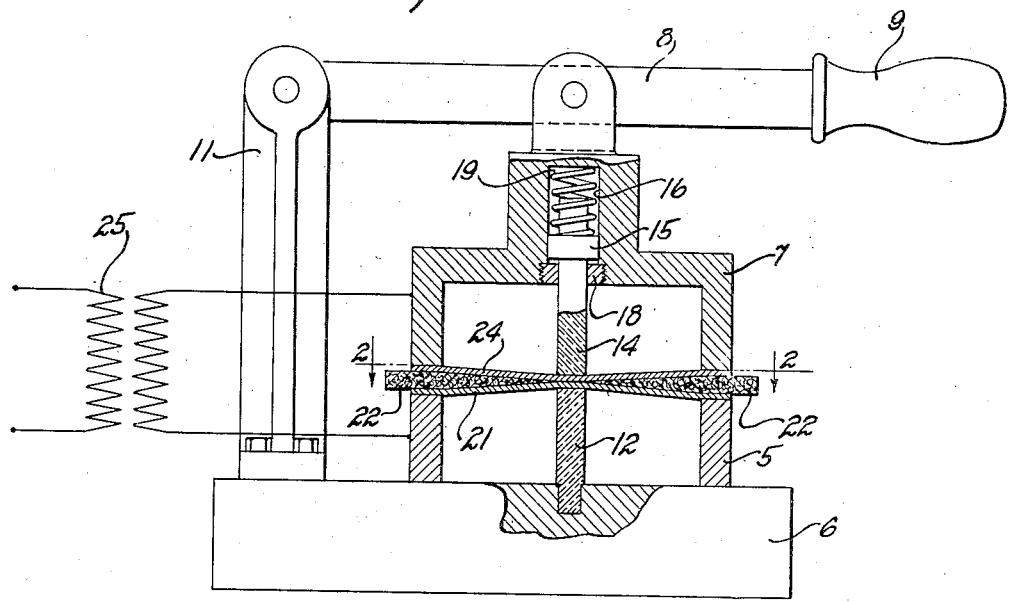
Figure 2:
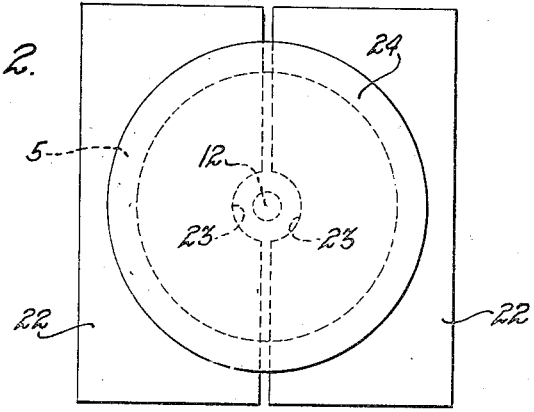

It is believed that a complete understanding of the invention may be had by reference to the following description taken in conjunction with the accompanying drawing, in which Fig. 1 is a side elevation, partly in section, of a welding apparatus with a diagrammatic representation of the welding circuit, and Fig. 2 is a plan view taken on line 2—2 of Fig. 1.

Referring to the drawings in which the same reference characters designate similar parts in the several views, an annular electrode 5 is shown mounted on a base 6. Cooperating with the electrode 5 is a second annular or cup-shaped electrode 7 carried by an arm 8 which is provided with a handle 9 and is pivotally supported on a standard 11 mounted on the base 6. Attached to the base and disposed centrally of the annular electrode 5 is a contact member 12 of insulating material which in conjunction with a similar contact member 14 mounted in the upper electrode serves to force the sheets to be welded into firm engagement at the point when the weld is to be formed. The contact member 14 is provided with an enlarged portion 15 which fits into a cylindrical cavity 16 in the electrode 7 and is held against a nut 18 threaded into the electrode 7 by means of a spring 19. The resilient mounting of the contact member 14 causes the member to engage the work with a definite pressure and at the same time compensates for any variation in the thickness of the sheets to be welded in allowing the electrodes to engage the sheets throughout their contact areas.

In practicing the method in connection with the welding of composite diaphragms for converting electrical impulses into sound as employed in telephone transmitters, a disk 21 of a highly conductive metal such as copper, or aluminum, is placed concentrically on the lower electrode and a pair of insulating inserts 22—22 are placed upon the disk. Each of the inserts 22 is provided with a central cut-out portion 23 towards which the insert is tapered along each radius. A second disk 24 of similar composition is then placed upon the inserts and the upper electrode is brought into engagement therewith by means of the handle 9. Due to the formation of the inserts 22—22 the contact members 12 and 14 will force the disks 21 and 24 into contact with each other over a small central area. When the parts are in the position shown in Fig. 1 a current is applied through a transformer 25 energized from any suitable source of power (not shown). On account of the large contacting areas of the electrodes with the material to be welded the current densities where the current passes from the electrodes to the work, will be quite small. Similarly the current densities in the peripheral region of the disks will be small because of the large cross-sectional area of its path, but as the current from the entire periphery converges toward the center its density will be increased until it reaches the point of contact where it is sufficient to form a weld between the disks.

It will thus be seen that the danger of fusing the electrodes to the work is completely eliminated, and while the invention is described and illustrated by a specific embodiment it will be understood that this is merely a convenient and useful form of the invention which is capable of many other modifications without departing from the spirit and scope of the invention.

What is claimed is:

1. A method of welding thin sheets of material, which consists of flexing the sheets so as to cause them to contact at a small area, applying current to an annular area of the sheets surrounding the contacting area, and converging the current toward the contacting area to increase its density and form a weld.

2. A method of welding thin sheets of material, which consists of insulating portions of the sheets from each other, flexing the sheets to cause uninsulated portions thereof to contact, and applying a welding current spaced from the area of contact of the sheets and to a larger area than the contact area.

3. In an apparatus for welding sheet materials, removable means for insulating portions of the sheet from each other, means for contacting the sheets at a point not insulated and a pair of electrodes covering larger areas than the contact area of the sheets for applying a welding current to the sheets.

4. In an apparatus for welding sheet materials, a pair of annular electrodes, and a contact member insulated from and disposed within the contacting area of each of the electrodes, said contact members being adapted to form a contact between the sheets to be welded.

5. In an apparatus for welding sheet materials, a cup-shaped electrode, a contact member insulated from the electrode disposed within the electrode, means for engaging the electrode with a sheet of material, and means for causing the contact member to contact the sheet with other material to be welded.

6. In an apparatus for welding sheet materials, a cup-shaped electrode, a contact member insulated from the electrode and yieldably mounted therein, and means for engaging the contact member with a sheet to engage the sheet with material to be welded thereto.

7. In an apparatus for welding sheet materials, a pair of electrodes, a plurality of insulating inserts tapering toward a cut-out portion and forming a disk with a central aperture, contact members mounted in the electrodes for causing the sheets to be welded to contact through the aperture, and means for applying a welding current to the electrodes.

8. A method of welding sheets of material which consists of interposing an apertured insulating member between the sheets, applying pressure to cause a small area of the sheets to contact through the aperture of the insulating member, and applying current to a larger area of the sheets spaced from the contacting area to effect a weld between the sheets.

9. In an apparatus for welding sheet material, a removable insert for insulating portions of the sheet from each other, a pair of electrodes for engaging the insulated portions of the sheets to apply a welding current thereto, and a pressure member insulated from one of the electrodes and yieldably mounted therein for causing a contact between uninsulated portions of the sheets to be welded.

10. In an apparatus for welding sheet materials, a pair of electrodes, an insulating insert tapering toward a cutout portion, contact members mounted in the electrodes for causing the sheets to be welded to contact through the cutout portion, and means for applying a welding current to the electrodes.

In witness whereof, I hereunto subscribe my name this 23d day of September, A. D. 1927.

CONRAD LOUIS PFEIFFER.